United States Patent
Kominar et al.

(10) Patent No.: US 10,248,161 B2
(45) Date of Patent: Apr. 2, 2019

(54) CONTROL OF AN ELECTRONIC DEVICE INCLUDING DISPLAY AND KEYBOARD MOVEABLE RELATIVE TO THE DISPLAY

(71) Applicant: BlackBerry Limited, Waterloo (CA)

(72) Inventors: Jeremy Lawson Kominar, Waterloo (CA); Neil Patrick Adams, Waterloo (CA)

(73) Assignee: BlackBerry Limited, Waterloo (CA)

( * ) Notice: Subject to any disclaimer, the term of this patent is extended or adjusted under 35 U.S.C. 154(b) by 25 days.

(21) Appl. No.: 15/247,261

(22) Filed: Aug. 25, 2016

(65) Prior Publication Data

US 2018/0059808 A1    Mar. 1, 2018

(51) Int. Cl.
| | |
|---|---|
| *G06F 1/16* | (2006.01) |
| *H04M 1/02* | (2006.01) |
| *G06F 3/0484* | (2013.01) |
| *G06F 3/0487* | (2013.01) |
| *G06F 3/0488* | (2013.01) |

(52) U.S. Cl.
CPC .......... *G06F 1/1624* (2013.01); *G06F 1/1677* (2013.01); *G06F 3/0487* (2013.01); *G06F 3/0488* (2013.01); *G06F 3/04842* (2013.01); *H04M 1/0237* (2013.01); *H04M 1/0245* (2013.01)

(58) Field of Classification Search
CPC ............... G06F 3/0338; G06F 3/04842; G06F 3/04883; G06F 1/1624; G06F 1/1666; G06F 1/1677
See application file for complete search history.

(56) References Cited

U.S. PATENT DOCUMENTS

| | | | | |
|---|---|---|---|---|
| 7,363,065 B2* | 4/2008 | Lee | ...................... | H04M 1/0237 455/414.1 |
| 7,474,298 B2* | 1/2009 | Nguyen | ................ | G06F 1/1624 345/156 |
| 7,535,376 B2* | 5/2009 | Jeon | ..................... | H04M 1/0237 340/662 |
| 7,860,540 B2* | 12/2010 | Mizuta | ................ | H04M 1/0237 455/566 |

(Continued)

FOREIGN PATENT DOCUMENTS

| | | |
|---|---|---|
| EP | 2031837 A2 | 3/2009 |
| JP | 2007274727 A | 10/2007 |

OTHER PUBLICATIONS

European Patent Application No. 17186132.1, Extended European Search Report dated Nov. 9, 2017.

*Primary Examiner* — Nalini Mummalaneni
(74) *Attorney, Agent, or Firm* — Borden Ladner Gervais LLP; Geoffrey deKleine

(57) ABSTRACT

A method of controlling an electronic device having a display moveable relative to a keyboard, between a first position in which the keyboard is not exposed and a second position in which the keyboard is exposed. The method includes, detecting movement of the display relative to the keyboard, to a third position, between the first position and the second position, in which the keyboard is partially exposed, determining a location of the display relative to the keyboard when the display is in the third position relative to the keyboard, identifying an action associated with the third position, and performing the action associated with the third position.

11 Claims, 5 Drawing Sheets

(56) References Cited

U.S. PATENT DOCUMENTS

| | | |
|---|---|---|
| 7,986,985 B2 | 7/2011 | Niitsu et al. |
| 2003/0038786 A1 | 2/2003 | Nguyen et al. |
| 2005/0032557 A1* | 2/2005 | Brunstrom .......... H04M 1/0235 455/575.1 |
| 2005/0208799 A1* | 9/2005 | Oda .................... H04M 1/0235 439/135 |
| 2006/0005131 A1* | 1/2006 | Tao ....................... G06F 1/1624 715/702 |
| 2009/0154082 A1* | 6/2009 | Nurmi ................... G06F 1/1624 361/679.3 |
| 2009/0249247 A1 | 10/2009 | Tseng et al. |

* cited by examiner

CONTROL OF AN ELECTRONIC DEVICE INCLUDING DISPLAY AND KEYBOARD MOVEABLE RELATIVE TO THE DISPLAY

FIELD OF TECHNOLOGY

The present disclosure relates to an electronic device including a display and a keyboard that is moveable relative to the display and to the control of such an electronic device.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones (smart phones), Personal Digital Assistants (PDAs), and tablet computers with wireless network communications or near-field communications connectivity such as Bluetooth® capabilities.

Portable electronic devices such as PDAs, or tablet computers are generally intended for handheld use and ease of portability. Displays that are moveable relative to a keyboard, from a position in which the keyboard is hidden to a position in which the keyboard is exposed for use are particularly useful on portable electronic devices, which are small and may have limited space for user input and output.

Improvements in electronic devices that include input devices such as keyboards are desirable.

BRIEF DESCRIPTION OF THE DRAWINGS

Embodiments of the present disclosure will now be described, by way of example only, with reference to the attached figures, in which.

DETAILED DESCRIPTION

Figure 1:
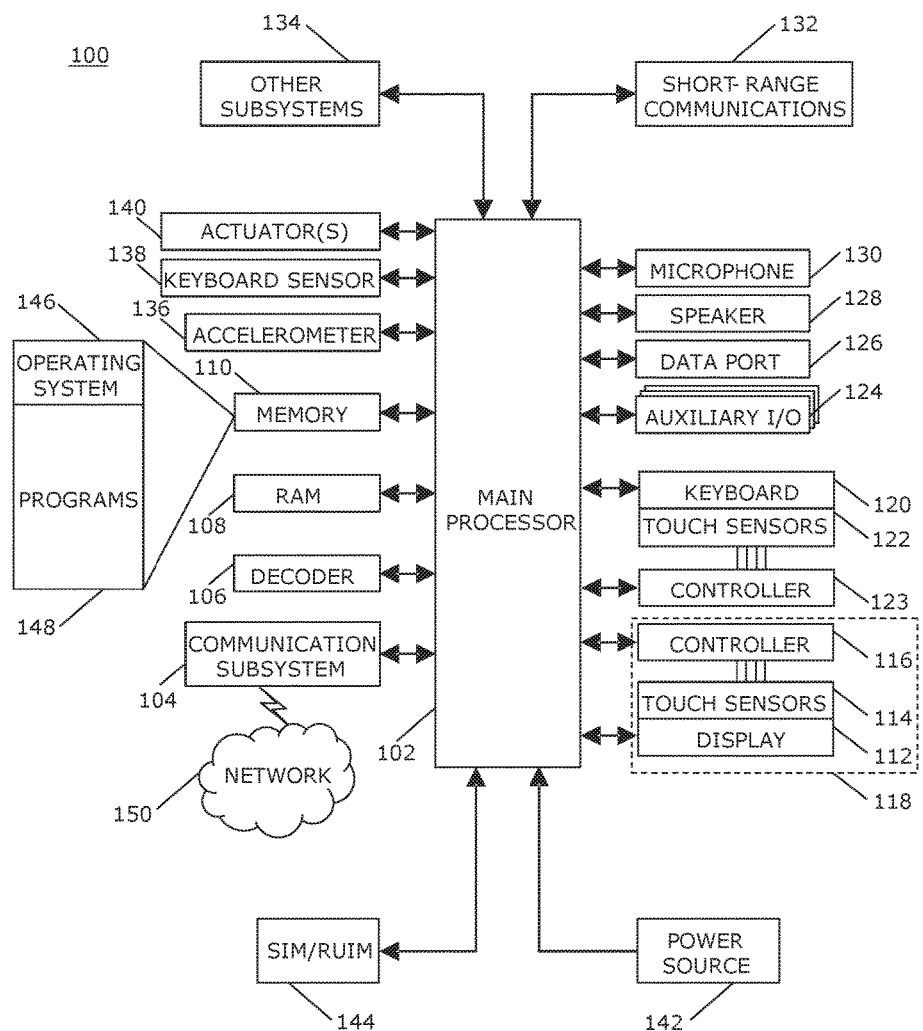
FIG. 1 is a block diagram of an example of a portable electronic device in accordance with the disclosure.

The following describes an electronic device including a keyboard and a display moveable relative to the keyboard, between a first position in which the keyboard is not exposed and a second position in which the keyboard is exposed for use, and a method of controlling the electronic device. The method includes, detecting movement of the display relative to the keyboard, to a third position, between the first position and the second position, in which the keyboard is partially exposed, determining a location of the display relative to the keyboard when the display is in the third position relative to the keyboard, identifying an action associated with the third position, and performing the action associated with the third position.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, such as a portable electronic device. Examples of portable electronic devices include mobile, or handheld, wireless communication devices such as pagers, cellular phones, cellular smart-phones, wireless organizers, personal digital assistants, wirelessly enabled notebook computers, tablet computers, mobile internet devices, electronic navigation devices, and so forth.

A block diagram of an example of an electronic device 100 is shown in FIG. 1. The electronic device 100 includes multiple components, such as a processor 102 that controls the overall operation of the electronic device 100. Communication functions, including data and voice communications, are performed through a communication subsystem 104. Data received by the electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the electronic device 100.

The processor 102 interacts with other components, such as a Random Access Memory (RAM) 108, memory 110, a touch-sensitive display 118, a physical keyboard 120, an auxiliary input/output (I/O) subsystem 124, a data port 126, a speaker 128, a microphone 130, short-range communications 132 and other device subsystems 134. The touch-sensitive display 118 includes a display 112 and touch sensors 114 that are coupled to at least one controller 116 that is utilized to interact with the processor 102. Input via a graphical user interface is provided via the touch-sensitive display 118. Thus, the touch sensors 114 and the controller 116 are utilized as an input device. Information, such as text, characters, symbols, images, icons, and other items that may be displayed or rendered on a portable electronic device, is displayed on the touch-sensitive display 118 via the processor 102. The keyboard may be, for example, a physical keyboard 120 that includes a plurality of mechanical keys that have mechanical switches or contacts for input to the electronic device 100 when a mechanical key of the keyboard is depressed by a sufficient force to oppose a bias of the mechanical key. In this example, touch sensors 122 are disposed on the physical keyboard 120 and the touch sensors 122 are coupled to a controller 123. Thus, in addition to depression of the mechanical keys of the physical keyboard 120 for input to the portable electronic device 100, touches on the mechanical keys are also detected for input to the processor 102.

The touch-sensitive display 118 is moveable relative to the physical keyboard 120. A keyboard sensor 138 is utilized to detect a location of the touch-sensitive display 118 relative to the physical keyboard 120 of the electronic device 100.

The processor 102 may also interact with an accelerometer 136 that may be utilized to detect direction of gravitational forces or gravity-induced reaction forces.

To identify a subscriber for network access, the electronic device 100 may utilize a Subscriber Identity Module or a Removable User Identity Module (SIM/RUIM) card 144 for communication with a network, such as the wireless network 150. Alternatively, user identification information may be programmed into memory 110.

The electronic device 100 includes an operating system 146 and software programs, applications, or components 148 that are executed by the processor 102 and are typically stored in a persistent, updatable store such as the memory 110. Additional applications or programs may be loaded onto the electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive touch-sensitive display. A capacitive touch-sensitive display includes capacitive touch sensors 114. The capacitive touch sensors may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected. A tap, which is a particular type of touch may be a touch that ends within a threshold period of time. Thus, the touch contact with the touch-sensitive display 118 is relatively short because contact ends within a threshold period of time of beginning.

One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

The touch sensors 122 on the physical keyboard 120 may be any suitable touch sensors, such as capacitive touch-sensors and may comprise any suitable material, such as indium tin oxide (ITO). Optionally, the touch sensors 122 disposed on the physical keyboard 120 may be coupled to the same controller 116 as the touch sensors of touch-sensitive display 118 such that a single controller is utilized rather than two controllers 116, 123.

One or more touches on the keys of the keyboard 120 may be detected. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the keyboard 120. A touch may be detected from any suitable input member and multiple simultaneous touches may be detected.

One or more gestures may also be detected by the touch sensors 122 disposed on the keyboard 120. A gesture on the keys of the keyboard 120 may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover.

The touch-sensitive display 118 includes a display area in which information may be displayed, and a non-display area extending around the periphery of the display area. Information is not displayed in the non-display area by the display, which non-display area is utilized to accommodate, for example, electronic traces or electrical connections, adhesives or other sealants, and/or protective coatings around the edges of the display area. The non-display area may be referred to as an inactive area and is not part of the physical housing or frame of the electronic device. Typically, no pixels of the display are in the non-display area, thus no image is displayed by the display 112 in the non-display area. Touch sensors may be disposed in the non-display area, which touch sensors may be extended from the touch sensors in the display area or distinct or separate touch sensors from the touch sensors in the display area. A touch on the touch-sensitive display 118, including a gesture, may be associated with the display area, the non-display area, or both areas. The touch sensors may extend across substantially the entire non-display area or may be disposed in only part of the non-display area.

Figure 2:
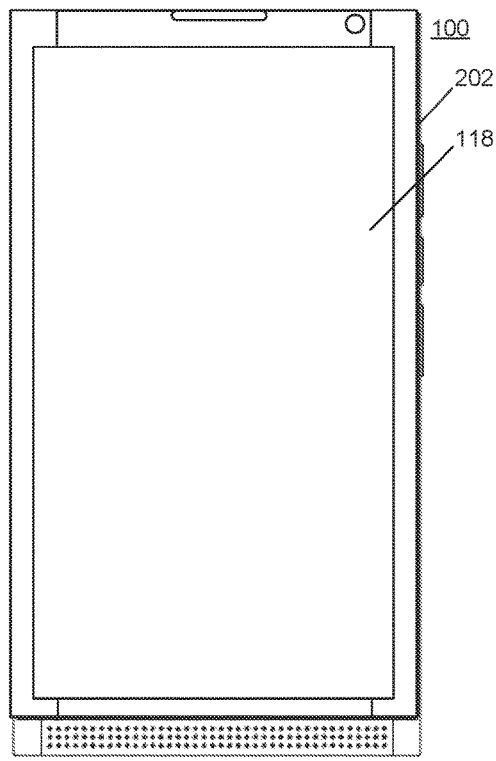
FIG. 2 is a front view of an example of a portable electronic device including a keyboard and a display that is movable relative to the keyboard, with the display in a first position, in accordance with the present disclosure.

A front view of an example of the electronic device 100 is shown in FIG. 2. The electronic device 100 includes a display housing 202 in which the touch-sensitive display 118 is disposed. The display housing 202 is utilized to house or support components including at least some of the components shown in FIG. 1.

Figure 3:
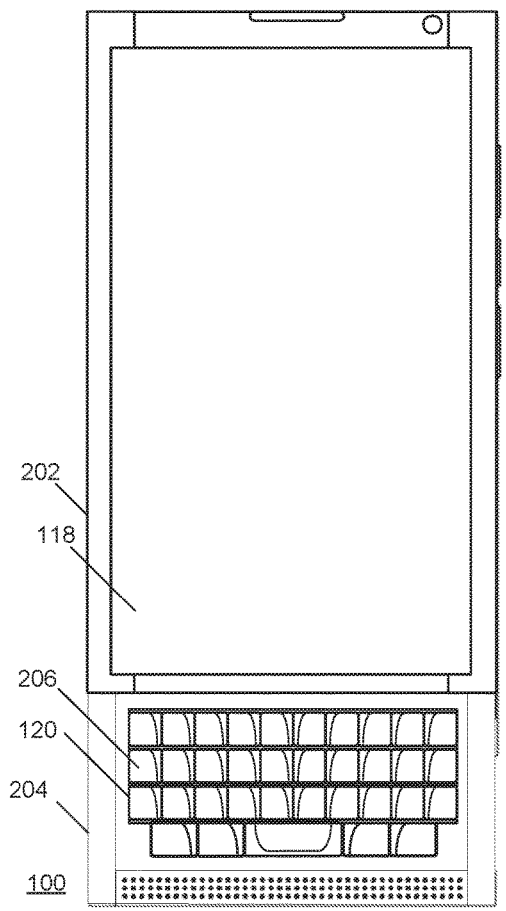
FIG. 3 is a front view of an example of the portable electronic device of FIG. 2 with the display in a second position, in accordance with the present disclosure.

The physical keyboard 120 is disposed in a keyboard housing 204, which is shown in FIG. 3, below the touch-sensitive display 118 in the orientation illustrated in FIG. 3. The physical keyboard 120 includes a plurality of mechanical keys 206. Each one of the mechanical keys 206 of the keyboard is associated with characters or a function such that the characters are entered utilizing the mechanical keys 206. The keyboard housing 204 may also be utilized to house or support components including at least some of the components shown in FIG. 1.

To move the touch-sensitive display 118 relative to the physical keyboard 120, the display housing 202 is moveable relative to the keyboard housing 204 by sliding the display housing 202 between a first position in which the keyboard housing 204 is stacked with the display housing 202 such that the physical keyboard 120 is disposed between the display housing 202 and a back of the keyboard housing 204, as shown in FIG. 2, and a second position in which the keyboard housing 204 extends from the display housing 202 to expose the physical keyboard 120 below the touch-sensitive display 118 in the orientation in which the portable electronic device 100 is illustrated in FIG. 3.

Thus, the touch-sensitive display 118 is moveable relative to the physical keyboard 120, between the first position, shown in FIG. 2, in which the physical keyboard is not exposed and the second position, shown in FIG. 3, in which the physical keyboard 120 is exposed for use. The physical keyboard 120 is therefore selectively exposable for use. The keyboard sensor 138, referred to above with reference to FIG. 1, is arranged and constructed to detect a position of the display housing 202 relative to the keyboard housing 204. The keyboard sensor 138 is coupled to the processor 102 to detect that the touch-sensitive display 118 is in the first position, the second position, or in a location between the first and the second positions. The processor 102 in connection with the keyboard sensor 138 may detect the number of rows of the physical keyboard 120 that are exposed, the percentage that the physical keyboard 120 is exposed, or may detect any intermediate position of the touch-sensitive display, between the first position and the second position, in which the physical keyboard is partially exposed. Thus, the keyboard sensor 138 together with the processor 102 detects movement of the touch-sensitive display 118 relative to the physical keyboard 120.

The physical keyboard 120 may be a QWERTY keyboard. Alternatively, other keyboard layouts may be successfully implemented, such as an AZERTY keyboard, a QWERTZ keyboard, or any other suitable keyboard.

Information may be displayed on the touch-sensitive display 118. The information displayed may include any suitable information such as icons, text, pictures, video, documents, a webpage, or any other suitable information. The information may be associated with, for example, a home page, a menu or submenu, an application or applications, and so forth. The information may be selectable, for example, by a touch on the touch-sensitive display 118, or by a touch, such as a hover gesture, a tap, a double tap, or other suitable touch, on the physical keyboard 120.

A virtual keyboard may also be displayed. The keys of the virtual keyboard may be selectable by a touch on an area of the touch-sensitive display 118 associated with the respective key. Display of the virtual keyboard may be discontinued in response to movement of the display housing 202 relative to the keyboard housing 204 to the second position, as shown in FIG. 3, to thereby expose the physical keyboard 120.

Figure 4:
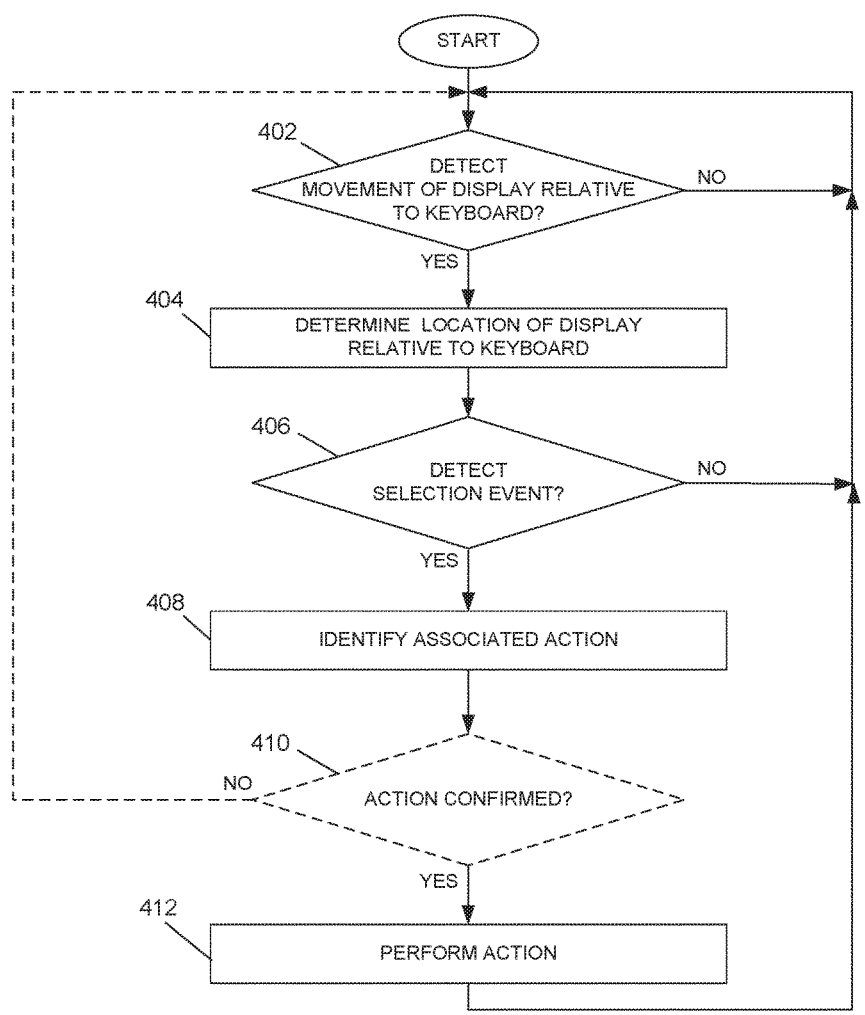
FIG. 4 is a flowchart illustrating an example of a method of controlling an electronic device in accordance with the disclosure.

A flowchart illustrating a method of controlling an electronic device that has a display moveable relative to the keyboard, such as the electronic device 100, is shown in FIG. 4. The method may be carried out by software executed, for example, by a processor 102 in a portable electronic device 100. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable medium, such as a non-transitory computer-readable device.

The method illustrated in FIG. 4 may be carried out, for example, any time the portable electronic device 120 is on and is running the operating system or an application.

In response to detecting movement of the touch-sensitive display 118 relative to the physical keyboard 120 at 402, the method continues at 404. In addition to the movement, a touch may be detected on the touch-sensitive display 118 at 402. The movement of the touch-sensitive display 118 relative to the physical keyboard 120 may be detected while information is displayed, such as a home page, a menu or submenu, or information related to an application. The information includes items that are selectable to perform an action such as launching an application, performing a task within an application, opening a window or screen, locking the portable electronic device 100, or any other suitable action. As movement of the touch-sensitive display 118 relative to the physical keyboard 120 occurs, a visual indicator may be displayed to identify one of the items from the information displayed.

Alternatively, the movement of the touch-sensitive display 118 relative to the physical keyboard 120 may be detected when no information is displayed on the touch-sensitive display 118 or information, including selectable items, may be displayed in response to detecting the movement to facilitate selection of the selectable item to perform an action.

The location of the touch-sensitive display 118 relative to the physical keyboard 120 is determined at 404. As movement of the touch-sensitive display 118 relative to the physical keyboard 120 occurs and the location of the touch-sensitive display 118 is determined, a visual indicator may be displayed to identify one of the items from the information displayed. The visual indicator may be any suitable indicator, such as highlighting of information, or display of an associated word, phrase, icon, or other identifier on the touch-sensitive display 118.

In response to detecting a selection event at 406, the method continues at 408. Detecting the selection event may include detecting that movement of the touch-sensitive display 118 relative to the physical keyboard 120, which is detected at 402, is discontinued for a period of time. For example, movement of the touch-sensitive display 118 relative to the physical keyboard 120 may be discontinued with the touch-sensitive display 118 in a third position relative to the physical keyboard 120, and the period of time that the movement is discontinued is compared to a threshold period of time. In response to determining that the period of time that movement is discontinued meets the threshold period of time, the method continues at 408. The threshold period of time may be any suitable period of time, such as three seconds, or any other suitable period of time.

An action associated with the location of the touch-sensitive display 118 relative to the physical keyboard 120, is identified at 408. The action is thus dependent on the location of the touch-sensitive display 118 when the movement of the touch-sensitive display 118 relative to the physical keyboard 120 is discontinued. The action that is identified may be dependent on the application or applications running on the portable electronic device 100 when the movement is detected or may be dependent on the state of the electronic device at the time movement is detected.

Optionally, the action may be confirmed or cancelled at 410. The action may be confirmed, for example, by further movement of the touch-sensitive display 118 relative to the physical keyboard 120, to the second position in which the physical keyboard 120 is exposed for use, after the selection event is detected at 404. Thus, the action may be confirmed and the method continues at 412. The action may also be cancelled at 410, for example, by further movement of the touch-sensitive display 118 relative to the physical keyboard 120, to the first position in which the physical keyboard 120 is not exposed.

The action identified at 408 is performed at 412. Thus, an application may be launched or opened, a task within an application may be performed, the portable electronic device 100 may be locked, or any other suitable action may be performed.

Alternatively, confirmation of the action may be received after the action is performed. Thus, the action may be performed and then confirmed or cancelled based on further movement of the touch-sensitive display 118 relative to the physical keyboard 120.

Reference is made to FIG. 2, FIG. 3, FIG. 5, FIG. 6, and FIG. 7 with continued reference to FIG. 4 to describe an example of control of the portable electronic device 100. In the present example, icons are displayed in a column on the touch-sensitive display 118. Each of the icons is associated with an action. For the purpose of this example, the icons include a lock 502 associated with locking the portable electronic device 100, a calendar icon 504 associated with entry of a calendar event, a phone icon 506 associated with a cellular telephone action, a mail icon 508 associated with an electronic message application, and a music icon 510 associated with a music application.

In the present example, movement of the touch-sensitive display 118 relative to the physical keyboard 120 is detected at 402 and the method continues at 404. The location of the touch-sensitive display 118 relative to the physical keyboard 120 is determined at 404. As movement of the touch-sensitive display 118 relative to the physical keyboard 120 occurs, the location of the touch-sensitive display 118 relative to the physical keyboard 120 is repeatedly determined and the icon associated with the location of the touch-sensitive display 118 relative to the physical keyboard 120 is displayed at a larger size to provide a visual indication of the associated icon. In the examples shown in FIG. 5, two rows of keys of the physical keyboard 120 are exposed and the phone icon 506 is displayed at a larger size.

Figures 5, 6:
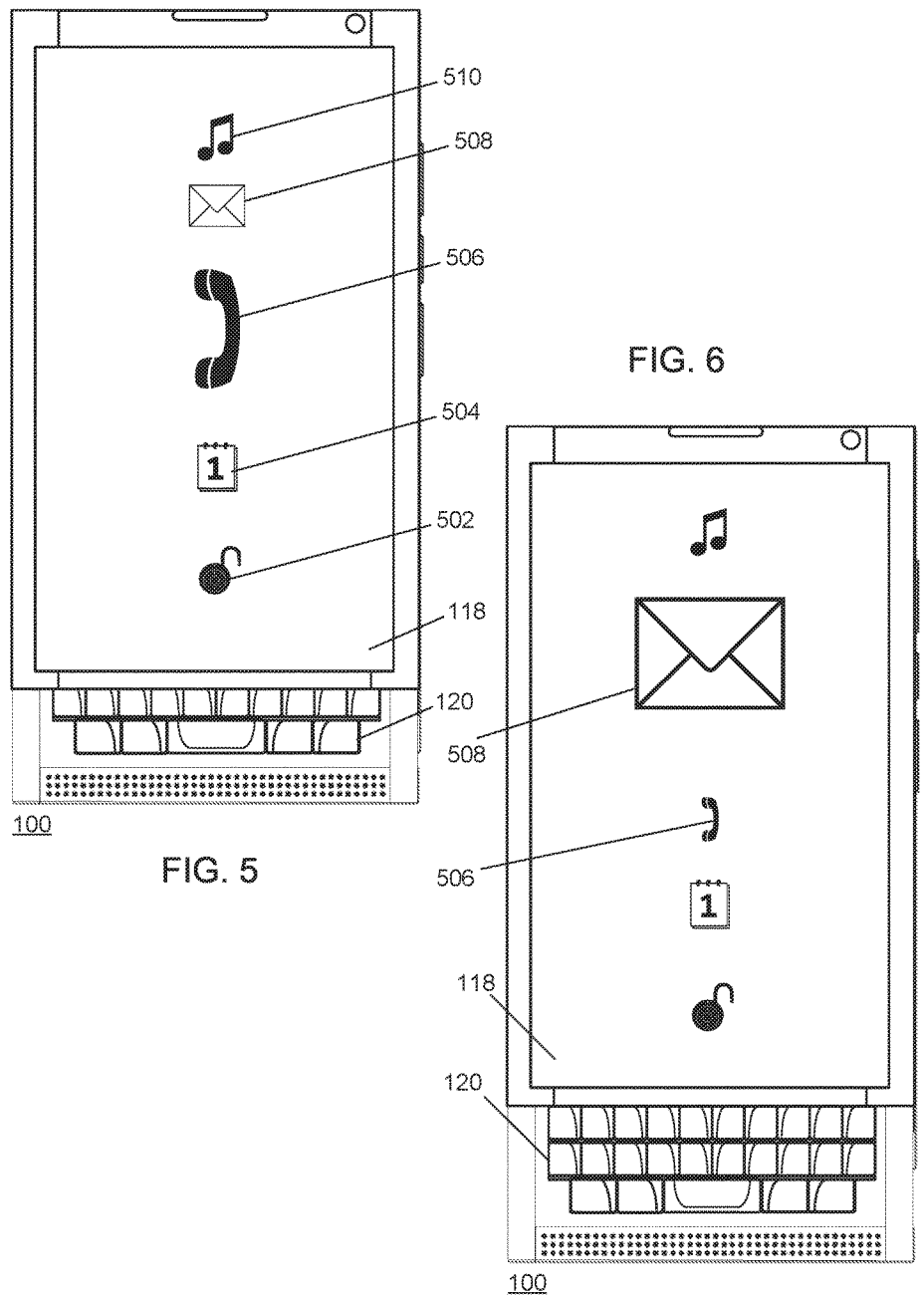
FIG. 5, FIG. 6, and FIG. 7 illustrate examples of control of the electronic device of FIGS. 2 and 3 in accordance with the present disclosure.
Figure 7:
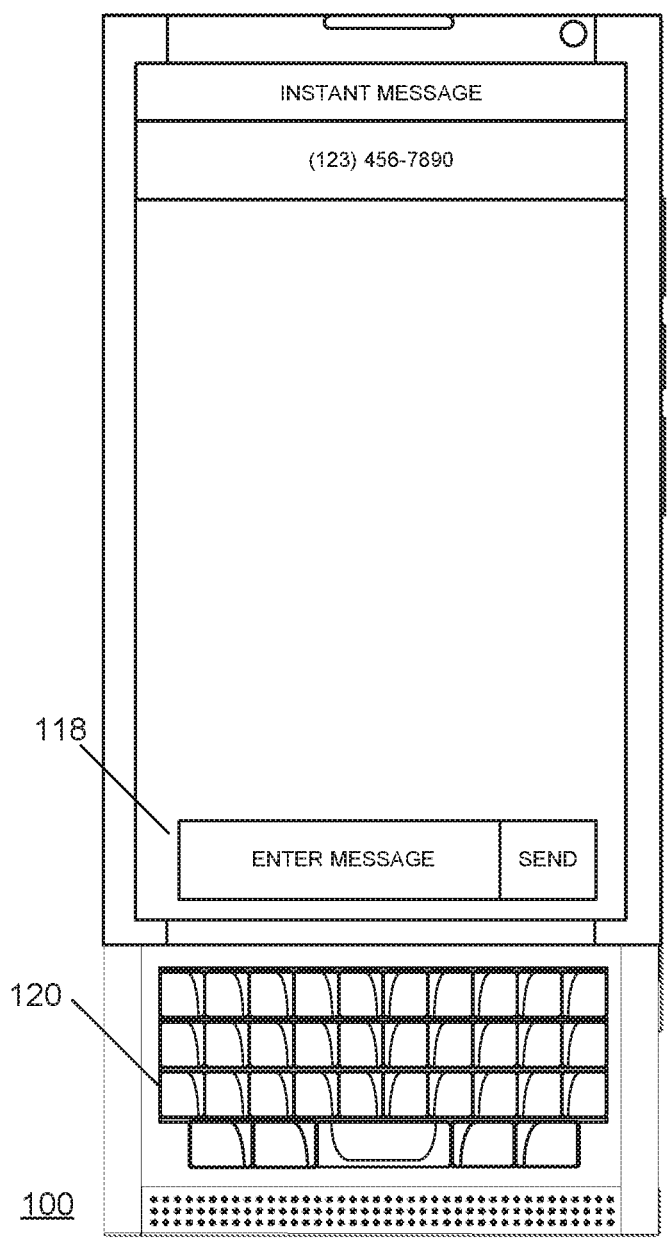

The movement of the touch-sensitive display 118 relative to the physical keyboard 120 continues to the position illustrated in FIG. 6 in which three rows of keys of the physical keyboard are exposed. With movement of the touch-sensitive display 118 relative to the physical keyboard 120, from the position shown in FIG. 5 to the position shown in FIG. 6, the phone icon is displayed at a smaller size compared to the size of the phone icon illustrated in FIG. 5 and the mail icon 508 is displayed at a larger size, visually indicating the mail icon.

Movement of the touch-sensitive display 118 relative to the physical keyboard 120 is discontinued for four seconds, a period of time that meets the threshold period of time, and the action associated with the mail icon 508 is selected.

The action associated with the location of the touch-sensitive display 118 relative to the physical keyboard 120, which in this example is the display of an interface for composing an instant message, is identified at 408.

Movement of the touch-sensitive display 118 relative to the physical keyboard 120 is resumed after the action associated with the mail icon 508 is selected and the movement continues until the physical keyboard 120 is fully exposed for use. The action identified at 408 is thereby confirmed at 410 and the action is performed at 412. The instant message composition interface is opened at 412 for composing an instant message. In the present example, the instant message composition interface is prepopulated with a recipient, which may be the contact from whom the most recent message was sent or received. Alternatively, the application may be launched without preselecting a recipient.

Advantageously, an action may be performed based on movement of the touch-sensitive display 118 relative to the physical keyboard 120. Thus, in the process of moving the touch-sensitive display 118 to expose the physical keyboard 12, the user may pause the relative movement to perform an action, reducing the time and number of steps to select an item or action.

The scope of the claims should not be limited by the embodiments set forth in the examples, but should be given the broadest interpretation consistent with the description as a whole.

What is claimed is:

1. A method of controlling an electronic device having a display moveable relative to a keyboard, between a first position in which the keyboard is not exposed and a second position in which the keyboard is exposed for use, the method comprising:

detecting movement of the display relative to the keyboard, to one of a plurality of positions, between the first position and the second position, in which the keyboard is partially exposed, each of the plurality of positions between the first position and the second position associated with a respective one of a plurality of actions;

displaying a list of selectable icons on the display, the selectable icons associated with the plurality of actions, and enlarging an icon of the selectable icons to provide a visual indication in the list of the selectable items, the visual indication moving with movement of the keyboard by changing which of the selectable icons is enlarged to enlarge another of the selectable icons in response to the movement of the keyboard, and thereby identify an associated one of the plurality of actions;

determining a location of the display relative to the keyboard when the display is in the one of the plurality of positions relative to the keyboard;

in response to detecting that movement of the display relative to the keyboard is discontinued for a threshold period of time with the display in the one of the plurality of positions, identifying the respective one of the plurality of actions associated with the one of the plurality of positions;

in response to detecting further movement of the display relative to the keyboard, to the second position in which the keyboard is exposed for use, after movement of the display relative to the keyboard is discontinued for the threshold period of time and after identifying the respective one of the plurality of actions, performing the respective one of the plurality of actions associated with the one of the plurality of positions.

2. The method according to claim 1, comprising detecting a selection event after detecting movement and prior to performing the one of the plurality of actions associated with the one of the plurality of positions.

3. The method according to claim 1, comprising cancelling the one of the plurality of actions in response to detecting further movement of the display relative to the keyboard, to the first position in which the keyboard is not exposed.

4. The method according to claim 1, wherein the one of the plurality of actions performed is dependent on the location of the display relative to the keyboard of the electronic device.

5. The method according to claim 1, wherein the one of the plurality of actions performed is dependent on an application running on the electronic device when the movement to the one of the plurality of positions is detected.

6. A non-transitory computer-readable storage medium having computer-readable code executable by at least one processor of the portable electronic device to perform the method according to claim 1.

7. An electronic device comprising:
a keyboard;
a display to display information thereon, wherein the display is moveable relative to the keyboard, between a first position in which the keyboard is not exposed and a second position in which the keyboard is exposed for use;
a sensor for detecting a position of the display relative to the keyboard;
a processor coupled to the display, the keyboard, and the sensor and operable to:
detect movement of the display relative to the keyboard, to one of a plurality of positions, between the first position and the second position, in which the keyboard is partially exposed, each of the plurality of positions between the first position and the second position associated with a respective one of a plurality of actions;
determine a location of the display relative to the keyboard when the display is in the one of the plurality of positions relative to the keyboard;
display a list of selectable icons on the display, the selectable icons associated with the plurality of actions, and enlarge an icon of the selectable icons to provide a visual indication in the list of the selectable items, the visual indication moving with movement of the keyboard by changing which of the selectable icons is enlarged to enlarge another of the selectable icons in response to the movement of the keyboard, and thereby identify an associated one of the plurality of actions;
in response to detecting that movement of the display relative to the keyboard is discontinued for a threshold period of time with the display in the one of the plurality of positions, identify the respective one of the plurality of actions associated with the one of the plurality of positions;
in response to detecting further movement of the display relative to the keyboard, to the second position in which the keyboard is exposed for use, after movement of the display relative to the keyboard is discontinued for the threshold period of time and after identifying the respective one of the plurality of actions, perform the respective one of the plurality of actions associated with the one of the plurality of positions.

8. The electronic device according to claim 7, wherein the one of the plurality of actions comprises one of launching an application, and performing a task within an application.

9. The electronic device according to claim 7, wherein the processor is operable to cancel the one of the plurality of actions in response to detecting further movement of the display relative to the keyboard, to the first position in which the keyboard is not exposed.

10. The electronic device according to claim 7, wherein the one of the plurality of actions performed is dependent on the location of the display relative to the keyboard of the electronic device.

11. The electronic device according to claim 7, wherein the one of the plurality of actions performed is dependent on an application running on the electronic device when the movement to the one of the plurality of positions is detected.

* * * * *